G. A. UNGAR.
FLEXIBLE COUPLING.
APPLICATION FILED DEC. 11, 1919.
1,406,112.
Patented Feb. 7, 1922.
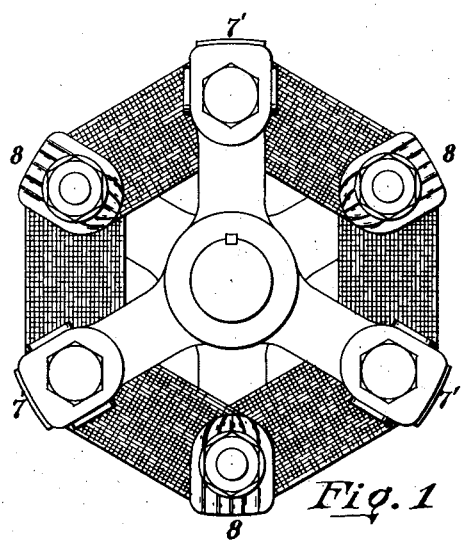
Fig. 1
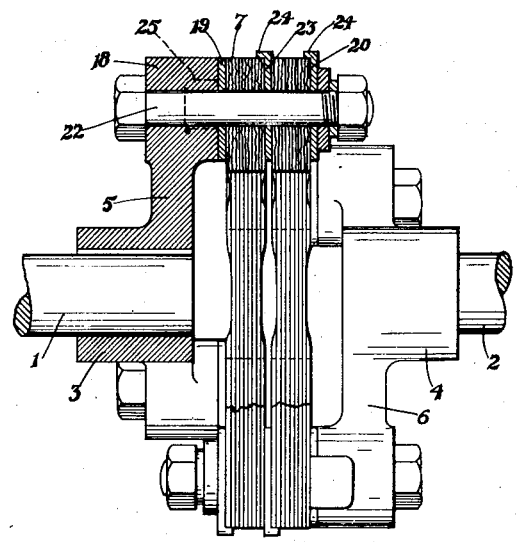
Fig. 2
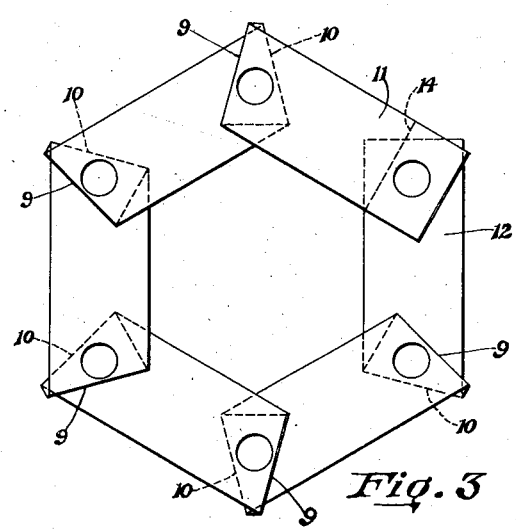
Fig. 3
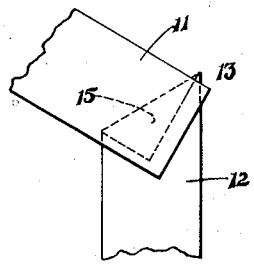
Fig. 4
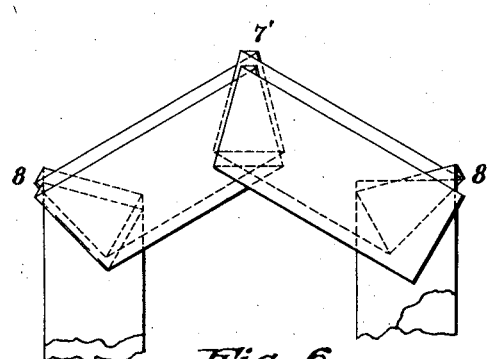
Fig. 6
Fig. 5
INVENTOR
G. A. Ungar
BY
Duell, Warfield & Duell
ATTORNEY

UNITED STATES PATENT OFFICE.

GUSTAVE A. UNGAR, OF PELHAM MANOR, NEW YORK, ASSIGNOR TO F. E. BLAIR & CO., INC., OF NEW YORK, N. Y., A CORPORATION OF NEW YORK.

FLEXIBLE COUPLING.

1,406,112.  Specification of Letters Patent.  Patented Feb. 7, 1922.

Application filed December 11, 1919. Serial No. 344,029.

*To all whom it may concern:*

Be it known that I, GUSTAVE A. UNGAR, a citizen of the United States, residing at Pelham Manor, in the county of Westchester and State of New York, have invented certain new and useful Improvements in Flexible Couplings, (B,) of which the following is a full, clear, and exact description, such as will enable others skilled in the art to which it appertains to make and use the same.

This invention relates to machine elements for transmission of torque, and with respect to its more specific features to couplings embodying a rotary driving member, a rotary driven member, and a flexible element or elements coupling the driving and the driven member to transmit rotary motion from one to the other and permit lateral displacement of the axis of the driving and driven members, as, for instance, the assumption of an angular relation between axes during the transmission of power. In its more particular features the invention relates to machine elements of the character above referred to wherein the flexible torque transmitting coupling element is of a fibrous nature as, for instance, cotton, leather or rubber, either alone or associated with each other, and preferably embodied in flexible disks, strips, or links, as more particularly pointed out hereinafter.

One of the objects of the invention is the provision of a practical flexible coupling of the character referred to, in which the flexible element may be a disk composed of one or more sections, in which the stress taking elements are disposed to resist the working stresses uniformly at various different points around the axis of rotation, and in which the torque taking strands, or threads, of the fabric going to make up the flexible element, as a disk, are disposed in substantially the position of maximum resistance to fracture as well as to distortion of the disk.

Other objects will be in part obvious and in part pointed out hereinafter.

The invention accordingly consists in the features of construction, combinations of elements and arrangement of parts, which will be exemplified in the construction hereinafter described and the scope of the application of which will be indicated in the following claims.

In the accompanying drawings forming part of this specification, and wherein similar reference characters refer to similar parts throughout the several views,—

Figure 1 is an end elevation of a flexible coupling embodying the invention;

Fig. 2 is a side view partly in longitudinal section;

Fig. 3 is a diagrammatic view illustrating one of the flexible elements of the coupling;

Fig. 4 is a diagrammatic view of one modified way of arranging the ends of the flexible element of Fig. 3;

Fig. 5 is a diagrammatic view of another way of arranging such ends: and

Fig. 6 is a diagrammatic view illustrating a modification of the flexible element of the coupling.

In the drawing, the numerals 1 and 2 indicate rotatable driving and driven shafts connected by a flexible joint which is designed to transmit torque from one shaft to the other and to permit displacement of the axis of the two shafts angularly relative to each other while in operation. The device finds a special utility in the transmission mechanism of automobiles. The numerals 3 and 4 indicate hubs of spiders fixed to rotate with shafts 1 and 2, and spider arms 5 and 6 extending from these hubs provide elements to which the intermediate flexible element or disk 7 is clamped. In the present embodiment each hub has three of said arms so as to provide a pair of spiders, and the arms of one shaft are connected to the disk at points 7', 7', 7', alternating with those 8, 8, 8, at which the arms of the other shaft are connected thereto around the axis of rotation and at some distance radially from the axis. In the present embodiment the clamping devices for all the arms are similar and a description of one will suffice for all.

The flexible element may be made of one or more layers or coils of fabric composed of threads, cords or strands, as, for instance, woven fabric, finding its embodiment in canvas. Layers of the material may be superposed and closely attached, as by rubberizing and gluing, so as to make a flexible element of any thickness desired.

In one form, illustrated in Fig. 3, the layers are made distinct from each other and attached together to form a complete flexible element. Each layer is made of one strip or riband of fabric, as canvas or leather or rubberized canvas, folded preferably to give continuity, or endless shape, to an otherwise discontinuous strip, and to provide superposed plies of the material where attached to the spider arms. In the manufacture of the continuous strip a straight narrow strip or riband may be taken and reversely folded on itself, intermediate its ends, at the several points as indicated in Fig. 3, where the numeral 9 indicates one fold and 10 a fold in the opposite direction. The opposite ends 11 and 12 of the strip may then be lapped as at 13 to make a continuous strip. Preferably, however, a triangular or suitably shaped flexible filling piece or member is disposed between the overlapped ends of the strip, as indicated at 14, where one edge of the filling piece is shown in dotted lines, opposite the overlapped ends 11 and 12, in order to provide a three-ply thickness at this point to accord with the three-ply thickness found at the several points 9, due to the folding at the latter points.

Or to complete the continuity of the strip one end may be folded back as indicated at 15 in Fig. 4 to provide a two-ply thickness, and the other end of the strip may lap the folded part 15, thus providing a three-ply thickness. Or each end of the strip may be folded back on itself opposite the overlapping parts, as indicated at 16 and 17, Fig. 5, and the edges of the folded portions placed face to face, thus providing a three-ply thickness.

Whereas applicant has indicated in Figs. 1 and 2 a single bolt construction for clamping the flexible element to the spiders, the bolt passing through the folded portions of the flexible element, it is to be understood that two or more bolts passing through the folds may be employed or the two bolts may pass one at each side of the flexible element, and through suitable extensions on the several clamping jaws.

Instead of making each layer of the flexible element from distinct strips, all, or more than one, of the layers of a disk may be made from one strip by first providing a length of strip capable of being coiled into one or more superposed layers and folding it in the manner diagrammatically illustrated in Fig. 6. In this figure the folds at the points 7' and 8 for attachment to the spider arms are similar to the folds at the same points in Fig. 3, but after one circuit has been completed another circuit is added by superposing additional length of the strip on the previously laid, or coiled, parts and folding them in a similar manner for attachment to the spider arms. In this form the ends of the strip may be terminated, as may be desired, to secure the same number of plies at all clamping points. The termination illustrated in Figs. 3, 4 and 5 may be employed for the purpose.

It is to be understood also that either of the above forms of clamping device may be utilized in connection with this form of flexible strip, that is to say, either a single bolt construction, a two-bolt construction penetrating the strip or a two-bolt construction where the bolts lie outside the strip.

By making the flexible disk of independent strips or of a single strip of woven fabric, folded as explained, one set of strands or threads of fabric may be set parallel to the line of pull between two spider arms and thus offer maximum resistance to the stress due to the torque. The face plate 19, spacing plates 23 and buckle plate or cooperative clamping element 20, are provided with teeth or corrugations the lengths of which lie generally radially of the axis of rotation and transversely of the line of torque strain, thus intersecting the line of torque strain at a large angle and also lying at substantially right angles to the direction of the torque taking strands of the flexible element. In this wise the maximum resistance above referred to is effected. Although the flexible element is illustrated as of polygonal form, it is to be understood that it may be made circular by folding properly shaped strips, or by fashioning the disk after folding.

By making a flexible torque transmitting element of a strip or strips as explained, an annular disk may be produced, and where woven fabric strips or ribands of the material are folded as previously explained, the faces of the coils or superposed plies will lie opposite each other, longitudinally of the axis of rotation. It is to be understood that the operative flexible disk is to be made up of a plurality of closely adhering and heavily compressed coils illustrated in Fig. 3, or a sufficient number of the coils like Fig. 6, closely adhering and compressed to make a disk of the thickness and strength desired. Two or more disks built as explained may be employed. In Figs. 1 and 2 is illustrated a form of clamping device for securing a plurality of the disks to two spiders. The disks are provided with openings for stringing on the pins or bolts 22, and the several clamping jaws 19 and 20 are corrugated as explained and as illustrated in Fig. 8. Spacing plates, or clamping jaws 23 may be interposed between the several complete disks, and said plates, as well as the buckle plate 20 may have lugs or flanges 24 to set and hold them relative to the disk. Also the facing plate 19 may have two lugs or ears 25 to engage opposite sides of the spider arms to set them in position. In this wise, when the coupling is assembled the corrugations or teeth of the jaws will take up the generally radial position before referred to.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:—

1. A device of the character described comprising, in combination, a driving member and a driven member, each comprising a spider having arms, and means for attaching a flexible torque transmitting element to said arms with the arms of one spider alternating with those of the other around the axis of rotation, said flexible element including a strip of fabric reversely folded intermediate its ends to provide superposed plies opposite the spider arms.

2. A device of the character described comprising, in combination, a driving member and a driven member, each comprising a spider having arms, and means for attaching a flexible torque transmitting element to said arms with the arms of one spider alternating with those of the other around the axis of rotation, said flexible element including a strip of fabric reversely folded intermediate its ends to provide superposed plies opposite the spider arms, the ends of said strip overlapping each other.

3. A device of the character described comprising, in combination, a driving member and a driven member, each comprising a spider having arms, and means for attaching a flexible torque transmitting element to said arms with the arms of one spider alternating with those of the other around the axis of rotation, said flexible element including a strip of fabric reversely folded intermediate its ends to provide superposed plies opposite the spider arms, the ends of said strip overlapping each other and attached to a spider arm.

4. A device of the character described comprising, in combination, a driving member and a driven member, each comprising a spider having arms, and means for attaching a flexible torque transmitting element to said arms with the arms of one spider alternating with those of the other around the axis of rotation, said flexible element including a strip of fabric reversely folded intermediate its ends to provide superposed plies opposite the spider arms, the ends of said strips overlapping each other and attached to a spider arm, one of said overlapped ends being folded opposite the overlapping portion of the other end.

5. A device of the character described comprising, in combination, a driving member and a driven member, each comprising a spider having arms, and means for attaching a flexible torque transmitting element to said arms with the arms of one spider alternating with those of the other around the axis of rotation, said flexible element including a strip of fabric reversely folded intermediate its ends to provide superposed plies opposite the spider arms, the ends of said strip overlapping each other and attached to a spider arm, each of said overlapping ends being folded opposite the overlapped portions, the edges of the folded ends lying face to face.

6. A device of the character described comprising, in combination, a driving member and a driven member, each comprising a spider having arms, means for attaching a flexible torque transmitting element to said arms with the arms of one spider alternating with those of the other around the axis of rotation, said flexible element including a strip of fabric reversely folded intermediate its ends to provide superposed plies opposite the spider arms, the ends of said strip overlapping each other, and a flexible filling member opposite said overlapped ends.

7. A device of the character described comprising, in combination, a driving member and a driven member, each comprising a spider having arms, and means for attaching a flexible torque transmitting element to said arms with the arms of one spider alternating with those of the other around the axis of rotation, said flexible element including a single riband of fabric coiled into two superposed plies with faces of the riband opposite each other, said strip being reversely folded intermediate its ends to provide superposed plies for attachment to the spider arms.

8. A device of the character described comprising, in combination, a driving member and a driven member, each comprising a spider having arms, and means for attaching a flexible torque transmitting element to said arms with the arms of one spider alternating with those of the other around the axis of rotation, said flexible element including a single riband of fabric coiled into two superposed plies with faces of the riband opposite each other, each ply of said strip being reversely folded intermediate its ends to provide superposed plies for attachment to the spider arms.

9. A device of the character described comprising, in combination, a driving member and a driven member, each comprising a spider having arms, and means for attaching a flexible torque transmitting element to said arms with the arms of one spider alternating with those of the other around the axis of rotation, said flexible element including a strip of woven fabric reversely folded intermediate its ends to provide superposed plies opposite the spider arms, one set of strands of said strip being parallel with the direction of the pull between said arms for any two of such arms.

10. A device of the character described comprising, in combination, a driving member and a driven member, each comprising a spider having arms, means for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including a strip of fabric reversely folded intermediate its ends to provide superposed plies for being clamped between said jaws.

11. A device of the character described comprising, in combination, a driving member and a driven member, each comprising a spider having arms, means for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including a strip of fabric reversely folded intermediate its ends to provide superposed plies for being clamped between said jaws, the ends of said strip overlapping each other for being clamped by said jaws.

12. A device of the character described comprising, in combination, a driving member and a driven member, each comprising a spider having arms, means for attaching a flexible torque transmitting element of said arms with the arms of one spider alternating with those of the other around the axis of rotation, including movable clamping jaws having teeth, the lengths of which are adapted to lie transversely of the line of torque strain, and pins on which said jaws are strung, said flexible element including a single riband of fabric coiled into two superposed plies with faces of the riband opposite each other, said strip being reversely folded intermediate its ends to provide superposed plies for attachment to the spider arms.

13. A device of the character described comprising, in combination, a driving member and a driven member, each comprising a spider having arms, means for attaching a flexible torque transmitting element of said arms with the arms of one spider alternating with those of the other around the axis of rotation, including movable clamping jaws having teeth, the lengths of which are adapted to lie transversely of the line of torque strain, and pins on which said jaws are strung, said flexible element including a single riband of fabric coiled into two superposed plies with faces of the riband opposite each other, each ply of said strip being reversely folded intermediate its ends to provide superposed plies for attachment to the spider arms.

14. A device of the character described comprising, in combination, a driving member, and a driven member, each comprising a spider having arms, means for attaching a flexible torque transmitting element to said arms with the arms of one spider alternating with those of the other around the axis of rotation, including movable clamping jaws having teeth, the lengths of which are adapted to lie transversely of the line of torque strain, and pins on which said jaws are strung, said flexible element including a strip of fabric reversely folded intermediate its ends to provide superposed plies opposite the spider arms.

15. A flexible disk for flexible couplings including a strip of fabric reversely folded intermediate its ends to provide superposed plies intermediate the ends of the strip.

16. A flexible disk for flexible couplings including a strip of fabric reversely folded intermediate its ends to provide superposed plies intermediate the ends of the strip, one of the ends of said strip being folded and lying on the other end.

17. A flexible disk for flexible couplings including a strip of fabric folded into a plurality of circumferential plies, each ply including a reverse fold.

18. A flexible disk for flexible couplings including a strip of fabric folded into a plurality of circumferential plies, each ply including a reverse fold, the reverse folds of the plies lying face to face.

19. A coupling disc for a universal joint comprising a continuous, flat strip of rubberized fabric folded into the form of a polygon having a greater number of thicknesses of the strip in some of its portions than in others.

In testimony whereof I affix my signature, in the presence of two witnesses.

GUSTAVE A. UNGAR.

Witnesses:
J. W. ANDERSON
LAURA E. SMITH.